US008682791B2

(12) United States Patent
Bies et al.

(10) Patent No.: US 8,682,791 B2
(45) Date of Patent: Mar. 25, 2014

(54) REDEMPTION OF CREDIT CARD REWARDS AT A POINT OF SALE (75) Inventors: Maureen J. Bies, Lindenhurst, IL (US); Bradford P. Hawley, Chicago, IL (US)

(73) Assignee: Discover Financial Services, Riverwoods, IL (US)

( * ) Notice: Subject to any disclaimer, the term of this patent is extended or adjusted under 35 U.S.C. 154(b) by 1176 days.

(21) Appl. No.: 11/555,013

(22) Filed: Oct. 31, 2006

(65) Prior Publication Data
US 2008/0103968 A1 May 1, 2008

(51) Int. Cl.
*G06Q 20/20* (2012.01)

(52) U.S. Cl.
CPC ..................................... *G06Q 20/20* (2013.01)
USPC .......................................................... 705/41

(58) Field of Classification Search
None
See application file for complete search history.

(56) References Cited

U.S. PATENT DOCUMENTS

| 5,774,870 | A | 6/1998 | Storey |
| 5,923,016 | A | 7/1999 | Fredregill et al. |
| 6,009,412 | A | 12/1999 | Storey |
| 6,018,718 | A | 1/2000 | Walker et al. |
| 6,434,534 | B1 | 7/2002 | Walker et al. |
| 6,578,012 | B1 | 6/2003 | Storey |
| 6,636,833 | B1 * | 10/2003 | Flitcroft et al. .................. 705/1 |
| 6,999,943 | B1 * | 2/2006 | Johnson et al. ................ 705/39 |
| 7,086,584 | B2 * | 8/2006 | Stoutenburg et al. ......... 235/379 |
| 7,359,880 | B2 * | 4/2008 | Abel et al. .................... 705/39 |
| 2002/0026348 | A1 | 2/2002 | Fowler |
| 2003/0061097 | A1 | 3/2003 | Walker et al. |
| 2003/0236704 | A1 | 12/2003 | Antonucci |
| 2003/0236712 | A1 * | 12/2003 | Antonucci et al. .............. 705/26 |
| 2004/0098317 | A1 | 5/2004 | Postrel |
| 2005/0060225 | A1 * | 3/2005 | Postrel ........................... 705/14 |
| 2005/0131792 | A1 | 7/2005 | Rowe |
| 2005/0149394 | A1 | 7/2005 | Postrel |
| 2005/0251446 | A1 * | 11/2005 | Jiang et al. ..................... 705/14 |
| 2006/0027647 | A1 | 2/2006 | Deane et al. |
| 2006/0208065 | A1 * | 9/2006 | Mendelovich et al. ....... 235/380 |
| 2006/0266821 | A1 * | 11/2006 | Zajkowski et al. ........... 235/380 |
| 2007/0194109 | A1 * | 8/2007 | Harrison et al. .............. 235/381 |

OTHER PUBLICATIONS

Fashion sense product information at web.archive.org/web/*/http://www.fashionsense.net/rms/productinfo.htm—10 pages—Feb. 24, 2005.*
Opinion Ex parte William Philip Shaouy and Matthew Bunkley Trevathan; May 24, 2007; Decision on Appeal.*
ABN-AMRO, "Bonanza Rewards".[ Downloaded from http://www.abnamro.co.in/creditcard/promotions/promotions_rewards.html on Mar. 7, 2006] 2pp.

(Continued)

*Primary Examiner* — Ella Colbert
*Assistant Examiner* — Mary Gregg
(74) *Attorney, Agent, or Firm* — Leydig, Voit & Mayer, Ltd.

(57) ABSTRACT

Systems and methods are described for redeeming rewards at a merchant's point-of-sale. The reward redemption takes place in real time and can be accomplished without the active participation of the merchant. A single credit card with no additional information may be used with a single swipe from the consumer to access both credit and rewards accounts, such that a single authorization request is made to encompass both rewards and credit. Merchants can be fully compensated for transactions by the issuer despite the customer's choice to redeem rewards.

9 Claims, 9 Drawing Sheets

(56) References Cited

OTHER PUBLICATIONS

ABN-AMRO, "Smart Reward Redemption".[ Downloaded from http://www.abnamro.co.in/creditcard/services/services_redemption.html on Mar. 7, 2006] 2pp.

Bjorhus, J., "Working to reap rewards", Jun. 12, 2005. 2pp.

Citibank, "Enjoy a 5% discount on purchases when you use your Citibank Rewards Points". [Downloaded from http://www.citibank.com/philippines/gcb/english/promo/ccard/080104_2/main.tm on Mar. 7, 2006] 2pp.

Citibank, "Rewards Point-of-Sale Redemption Terms and Conditions". [Downloaded from http://www.citibank.com/philippines/gcb/english/promo/ccard/080104_2/tandc.tm on Mar. 7, 2006] 4pp.

Dualcurrency Systems, "Executive Summary", Nov. 2005. 4pp.

Ernex, "Real-time Rewards Closer to Reality", Nov. 23, 2004. [Downloaded from http://www.ernex.com/articles/credit_card_rewards_program.asp on Mar. 9, 2006] 4pp.

Ernex, Accelerator product description [Downloaded from http://www.ernex.com/loyalty_programs/loyalty_programs_card_accelerator.asp on Mar. 9, 2006] 2pp.

Ernex, Reporter's Summary, "Ernex launches real-time redemption", Feb. 25, 2002. [Downloaded from http://www.ernex.com/press_releases/2002_02_25_p.asp on Mar. 7, 2006] 3pp.

SPECTRA Technologies, "HSBC made use of SPECTRA P2000 POS terminals to launch Instant Redemption of Rewards Points", Jun. 2, 2005. [Downloaded from http://www.spectratech.com/Home.aspx/92 on Mar. 7, 2006] 1p.

SPECTRA Technologies, "Standard Chartered Bank came to SPECTRA Technologies for its Smart Card Loyalty Programs", Jun. 2, 2005. [Downloaded from http://www.spectratech.com/Home.aspx/87 on Mar. 7, 2006] 1p.

Visa, "Visa Introduces Smart-Card Rewards Platform", Apr. 23, 2002. [Downloaded from http://usa.visa.com/about_visa/newsroom/press_releases/nr120.html on Mar. 7, 2006]. 2pp.

Lindenmayer, I., "Visa Pins Key Apps to New Architecture" in *American Banker*, Jan. 5, 2006.

SPECTRA Technologies, "HSBC made use of SPECTRA P2000 POS terminals to launch Instant Redemption of Reward Points", [Downloaded from http://www.spectratech.com/Home.aspx/92 on Nov. 5, 2006].

* cited by examiner

REDEMPTION OF CREDIT CARD REWARDS AT A POINT OF SALE

FIELD OF THE INVENTION

This invention pertains generally to the field of consumer electronic transaction systems and more particularly to redemption of consumer rebates or rewards at a point-of-sale.

BACKGROUND OF THE INVENTION

As credit cards, debit cards, and other alternatives to currency have grown in popularity, the competition among the institutions that provide these financial instruments has also increased. Today, many consumers choose a credit card, debit card, or the like, based on the financial incentive to the consumer for using such a card. One popular incentive offered are points, miles, cash or other rewards. Typically, for every transaction made by a cardholder using, say, a credit card, a proportional number of points, miles or other rewards are placed into a separate account. When a sufficient amount of rewards have accumulated in the account, the consumer may be able to redeem them for goods, services, or discounts toward the purchase of same.

Traditional reward systems have been limited by the extent to which rewards could be redeemed. For example, rewards in the form of airline miles may be limited to redemption only for travel, and only on a particular airline. Similarly, loyalty points rewarded by a particular retail store may be limited to redemption only at that store.

Other reward systems have allowed for a variety of redemption choices, but may be limited in the manner of redemption: many existing systems require the cardholder to redeem through a centralized fulfillment center, be it by mail, phone or online. This often results in inconvenience to the cardholder and delay in the use of the redeemed reward. Similarly, some rewards systems, such as most airline miles reward systems, have extremely high minimum thresholds for redemption of rewards (e.g., 25,000 miles needed to redeem for a flight).

Although some systems have attempted to provide for redemption of rewards at a merchant's point-of-sale, these systems suffer from any of several limitations. Existing systems may require the active participation of the merchant, taking the form of installing special equipment for redeeming rewards, modifying the merchant's transaction database and systems to account for reward redemption, paying an additional fee to the card's issuing bank for processing a reward redemption transaction, and/or changing employees' workflow processes to provide necessary interaction with the cardholder to effectuate a rewards redemption. In short, no existing rewards redemption system is transparent to the merchant.

Traditional reward systems require separate authorizations for reward redemptions and credit purchases. For example, some existing cards contain two magnetic stripes: one containing credit card information, and one containing rewards account information. Using such a dual-striped card, the cardholder or merchant must make two swipes of the card—typically on different devices—if both credit and reward points are to be used. Further, two networks are used for such a transaction: one network for the credit card authorization, and one for the rewards account authorization.

SUMMARY OF THE INVENTION

Embodiments of the invention provide systems and methods for redeeming rewards at a merchant's point-of-sale. The reward redemption advantageously takes place in a short amount of time, during a customer's checkout transaction with the merchant, and can be accomplished with little or no modification to existing checkout workflows. A single credit card with no additional information may be used with a single swipe from the consumer to access both credit and rewards accounts. The systems and methods of the present invention can be implemented using existing point-of-sale and network systems with little modification.

An additional advantage found in embodiments of the invention is the ability to use a standard credit card network and protocol for non-transactional, or non-standard purposes, such as redeeming rewards, checking reward balances, or transmitting customized messages from an issuer for display to a customer.

In one aspect, a method is provided for enabling a customer to pay for goods or services at a merchant's point-of-sale using a combination of monetary funds and/or reward funds, the method comprising receiving a request from a terminal device located at the point-of-sale to authorize a transaction to be funded with a combination of zero or more monetary funds and one or more reward funds, the monetary funds and reward funds each being associated with a single customer, the monetary funds being further associated with a credit, debit or stored value account, and the reward funds being further associated with a reward funds account; determining, in response to the request, the maximum amount of reward funds that can be used for the transaction; holding from the customer's reward funds account the maximum amount of reward funds that can be used for the transaction; decrementing, in response to the request, the total available monetary funds associated with the credit or debit account; and sending to the terminal device a single response approving for the transaction, monetary funds in the decremented amount and a reward funds charge in the held amount.

In another aspect, a method is provided for redeeming reward funds at a merchant's point-of-sale in real time in conjunction with a transaction for the purchase of goods or services, the reward funds stored in a reward funds account and associated with a credit account of a customer belonging to an issuing financial institution, the method comprising presenting a card containing the customer's credit account indicia to a terminal device; receiving an approval notice via the terminal device, the approval notice reflecting at least in part an approved reward funds charge amount; indicating, in response to the approval notice, a first amount of the purchase price to be paid from the reward funds account, the first amount being equal to or less than the approved reward funds charge amount; and causing to be stored a transaction report indicating that the first amount is to be paid from the reward funds account and that the remainder of the purchase price is to be paid from other than the reward funds account.

In yet another aspect, a system is provided for allowing a customer to pay for a transaction of goods or services at a merchant's point-of-sale using a combination of credit and reward funds, the system comprising: a credit account for the customer held by an issuer; a reward funds account for the customer managed by the issuer; an account number corresponding to both the credit account and the reward funds account of the customer; a terminal device located at the point-of-sale for receiving the account number; an authorization request initiated by the terminal device, for requesting authorization for the transaction from the issuer, wherein the request comprises a request for authorization of credit from the issuer in an amount corresponding to the transaction value, and a request for authorization of reward funds in amount less than or equal to the lesser of the transaction value and the balance of the reward funds account; a network in connection with the terminal device and the issuer; and an authorization processor residing on the network for processing the authorization request and for communicating to the terminal device whether the request has been approved by the issuer.

In yet another aspect, a system is provided for allowing a customer to pay for a transaction of goods or services at a merchant's point-of-sale using a combination of credit and reward funds over a transaction processing network, the system comprising a data structure, the data structure comprising a reward funds amount field for storing a value less than or equal to the amount of the total transaction, and a credit amount field for storing the difference between the total transaction amount and the value stored in the reward funds amount field.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

For simplicity, the description that follows will be provided by reference to a specific type of financial alternative to currency known in the art as a "credit card". However, as will be clear to those skilled in the art, no aspect of the present invention is specifically limited to credit card applications. Therefore, it is intended that the following description also encompass the use of the present invention with many other forms of financial alternatives to currency, including debit cards, smart cards, single-use cards, pre-paid cards, electronic currency (such as might be provided through a cellular telephone or personal digital assistant), automated collection systems (such as an electronic toll collection system), and the like.

Similarly, while the description that follows will, for simplicity, be provided by reference to a specific type of award (or "reward"), known in the art as a "cash reward", it is not intended to limit the use of the present invention to award systems dealing only with cash rewards. For example, the present invention can be applied to award programs offering credits, discounts, refunds, miles, points and the like.

A financial institution providing alternatives to currency, such as credit cards, generally receives income from at least two sources: (1) the merchant, who remits to the financial institution a fee that is customarily a small fixed transaction fee plus a percentage of the purchase price of an item purchased by a consumer using the financial institution's credit card and (2) the consumer, who pays interest charges on unpaid balances that are generally, for consumer purchases, at a rate in excess of the prime rate of interest. Therefore, to increase income, a financial institution offering credit cards generally seeks to increase the total number of transactions and the total value of goods purchased by consumers using that institution's credit cards, which directly increases the income received from merchant fees and indirectly may increase the unpaid balance maintained by consumers, thereby increasing interest revenue. One common mechanism for increasing the total value of the goods purchased by consumers using the financial institution's credit cards is to offer an award, such as a cash rebate award, that is directly based on the total value of the goods purchased within a given time frame.

Merchants generally receive income mainly from the sale of goods or services to consumers. Many merchants enter arrangements to accept consumers' credit cards so that consumers have alternative, more convenient ways of paying for the goods or services. To those merchants, any extra costs borne by them for handling the credit card transactions typically are offset by the increased sales volume resulting from new customers who otherwise may have shopped elsewhere, or from existing customers who can more conveniently pay for greater amounts.

Because both merchants and the credit card issuer share a goal of increasing consumption by consumers, merchants and issuers sometimes cooperate in incentive programs aimed at persuading consumers to use the issuer's card at particular merchants. For example, a card issuer may have a promotion whereby an increased amount of rewards are earned when shopping at a particular merchant. These incentive programs also may exist with respect to redemption of rewards: one issuer's rewards might be redeemable for, say, gift certificates valid only at the merchant.

Figure 1:
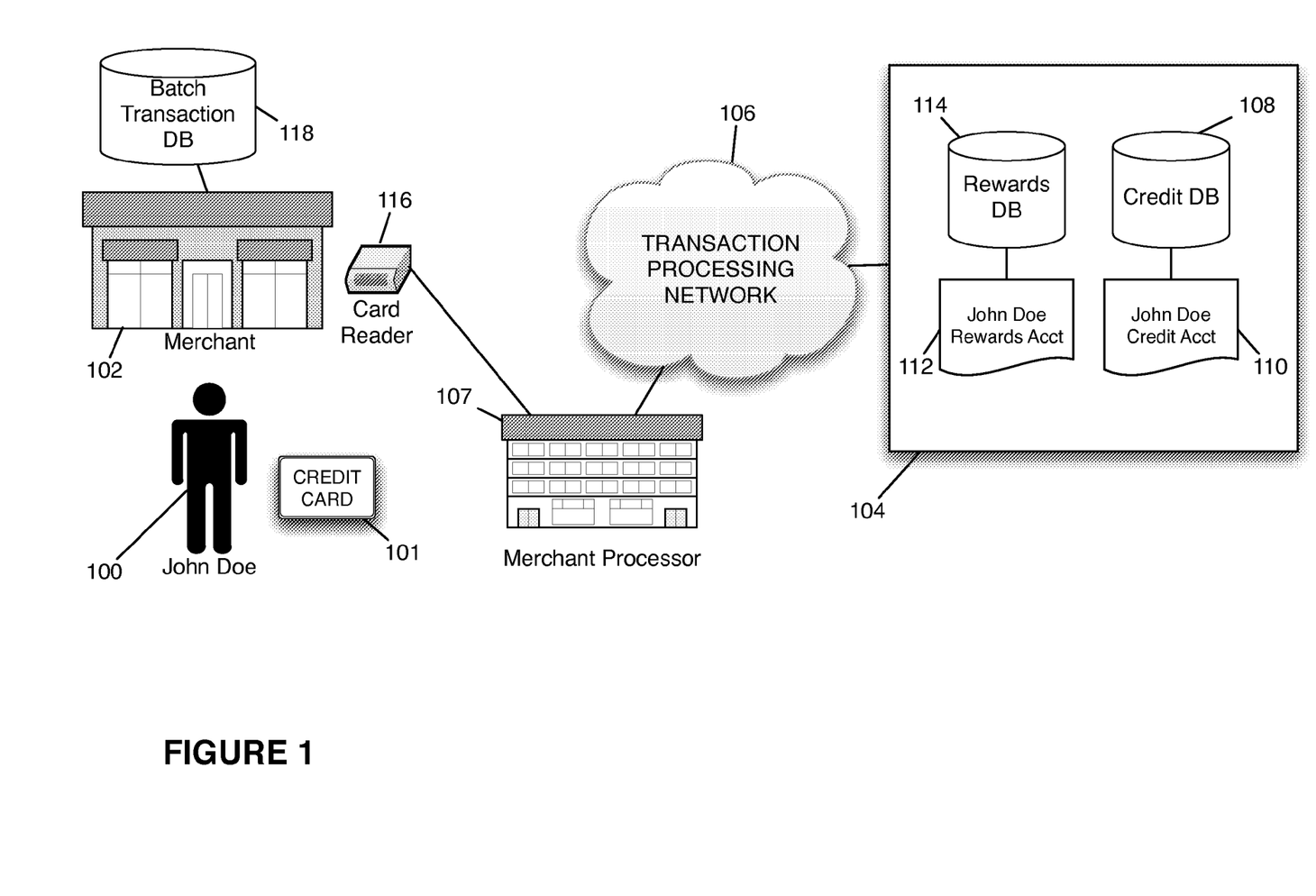
FIG. 1 is a is a general overview of the operation of a method and system contemplated by an embodiment of the present invention.

Turning to FIG. 1, an implementation of a point-of-sale reward redemption system contemplated by an embodiment of the present invention is shown with reference to an overall credit card usage environment. A consumer 100 can use a credit card 101 to purchase goods or services at any number of locations. An exemplary location illustrated in FIG. 1 is the merchant 102. Although the merchant 102 is depicted in FIG. 1 as brick-and-mortar stores, the merchant 102 need not be so limited in physical presence. For example, the merchant 102 could include a telephone-based retailer, a computer-based retailer operating a web site, a mail-order catalog retailer, or a merchant transacting business through some other medium. As will be known by those skilled in the art, the merchant may offer a variety of goods and services. For example, one of the merchant 102 can be a grocery store or mass-market retailer, or it can be a doctor's office or an accountant's office. Similarly, the merchant 102 can, for example, be an on-line retailer, or it can be an interface to private party transactions, such as through an auction web site.

Once the consumer 100 has decided to purchase goods or services, using a credit card 101, from the merchant 102, an authorization can be obtained from a financial institution 104. Generally, financial institution 104 is the issuer of the credit card 101 being used by the consumer. An authorization from the financial institution 104 allows the consumer 100 to receive goods and services from the merchant 102 and allows the merchant to be reimbursed by the financial institution 104.

Typically, an authorization can be obtained from the financial institution 104 through a transaction processing network (or "payments network") 106, which can be a commercial network with an operator of the network, for example, DISCOVER, AMERICAN EXPRESS, VISA or MASTERCARD, or the Internet, a dedicated secure network, or even the phone system, such as through a voice phone call to a representative of the financial institution 104. The operator of the network 106 may or may not be affiliated with the financial institution or issuer 104. In some embodiments, a merchant processor 107, often on behalf of an acquiring bank for the merchant 102, may be used by the financial institution 104 as an intermediary for handling authorization requests. Alternatively, the merchant 102 communicates directly with the financial institution or issuer 104 via the network 106. The financial institution 104 can maintain a database, such as database 108 to record transactions performed by consumers using its issued cards. Information for a credit account 110 for the consumer 100 can be stored in the database 108.

In an embodiment of the invention, the issuer 104 maintains information for the consumer's 100 accumulated rewards for using the credit card 101 in an account 112 stored in a rewards database 114. Alternatively, the rewards database 114 is maintained by an outside entity (not shown) in communication with the issuer 104. The rewards database 114 can alternatively be connected directly to the network 106 without going through the issuer 104.

An overview of the point-of-sale redemption process is now described with respect to FIG. 1, in accordance with an embodiment of the invention. The consumer 100, wishing to pay for goods from the merchant 102, presents his credit card 101. The card 101 preferably contains a magnetic stripe for storing credit account 110 and/or consumer 100 indicia. Alternatively or additionally, the card contains an RFID tag, stored memory and/or visual representations of the indicia. By using such alternative representations of the indicia, embodiments of the invention are not limited to conventional credit cards 101, but also include the use of alternative payment devices, such as cellular or wireless phones, personal digital assistants, smart cards, U.S.B. drives, etc., or biometric payment systems. Generally, a single set of indicia representing a single account of the consumer's 100 (e.g., consumer name, account number, expiration date, etc.) is used for a typical transaction. On a card 101, the same set of consumer indicia may be present in multiple forms (e.g., the customer name and an account number might appear as visual text on the card 101 and also might be encoded onto a magnetic stripe on the card). Cards 101 can also contain multiple sets of indicia, such as indicia for a credit account 110, indicia for a rewards account 112, indicia for a store loyalty program, etc. Cards containing multiple sets of indicia generally contain multiple instances of the same form, for example, multiple magnetic stripes, multiple printed account numbers, etc.

The consumer 100 or the merchant 102 swipes the card 101 through a terminal device 116. Although the terminal device 116 is presently described in terms of a magnetic stripe card reader, the terminal device is alternatively an RFID reader, smart card reader, cash register, computer, biometric scanner, or any other input device whereby the credit account 110 and/or consumer 101 indicia can be entered either automatically or manually. The terminal device 116 preferably contains a display for presenting messages and information to the consumer 100 and/or merchant 102.

Once the card 101 has been presented for an intended purchase, an authorization request is sent to the issuer 104 for the amount of the transaction, perhaps via the merchant processor 107. In an embodiment of the invention, included in the request is an indicator that the terminal is capable of transacting rewards, and that the transaction may be eligible for payment via rewards from the consumer's 100 rewards account 112. The issuer 104 authorizes the transaction by placing a hold in that amount on the consumer's 100 credit account 110. Additionally, the issuer 104 determines the maximum amount of rewards available from the consumer's 100 rewards account 112 and places a hold on this amount. The issuer 104 sends a message back to the merchant's 102 terminal device 116, which presents the consumer 100 with an option to redeem up to the held amount of rewards. The consumer 100 can preferably choose to use all, some or none of the rewards for his purchase. Any difference between the chosen amount of rewards and the total transaction price is then charged to the consumer's 100 credit account 110. If the consumer 100 chooses to use less than all the available rewards, the terminal device 116 preferably communicates this to the issuer 104, who can release the hold on the unused portion of the rewards. Upon approval of the sale, the merchant 102 preferably generates a sales receipt indicating the breakdown of credit and rewards to be charged to the consumer's 100 respective accounts 110, 112 for the transaction. Alternatively, a message is included on the receipt indicating that rewards were used for the transaction.

A record for the transaction is preferably stored in a batch transaction database 118 associated with the merchant 102, for later settlement processing. The transaction record contains fields for amounts to be charged to both the credit account 110 and the rewards account 112. At settlement, the merchant is preferably fully reimbursed by the issuer 104 for the entire transaction amount (minus any usual fees), regardless of whether any portion of the transaction is to be charged to the rewards account 112.

Figure 2:
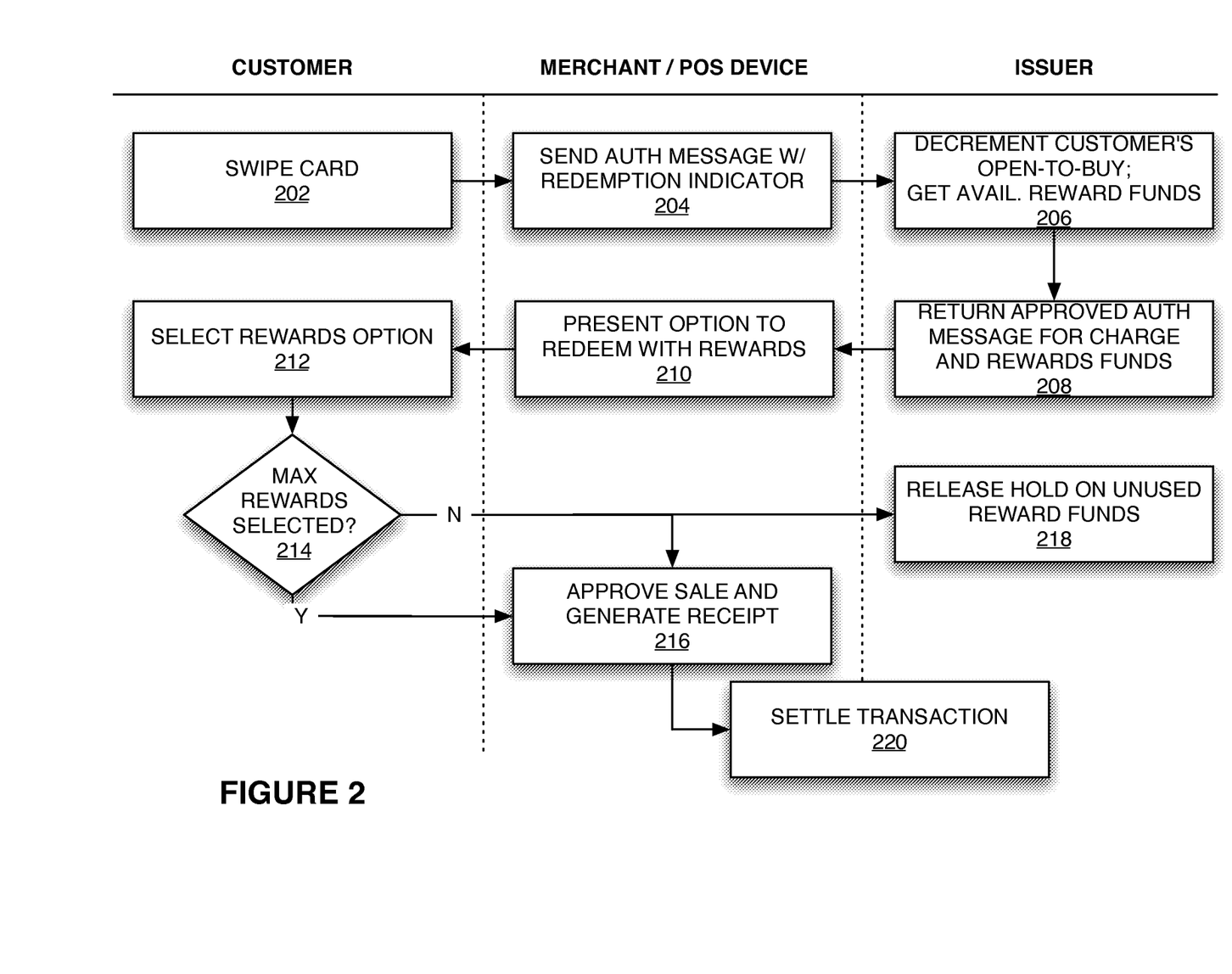
FIG. 2 is a flow diagram illustrating a method for redeeming rewards at a point-of-sale, in accordance with an embodiment of the invention.

In greater detail, FIG. 2 illustrates a method for redeeming rewards at a point-of-sale, in accordance with an embodiment of the invention. The process begins when a customer is ready to purchase goods or services at, for example, a checkout counter of a merchant. The customer presents his credit card for payment of the purchase and swipes it through a card reader terminal device at step 202. It is not necessary that the customer himself swipe the card; alternatively, the merchant or another may swipe it. Further, embodiments of the invention are not limited to the swiping of magnetic cards and card readers—other methods of inputting card information may be used, including manual entry (via, e.g., a keypad on the terminal device), biometric scanning, or contactless methods such as RFID, infrared or Bluetooth. Once the card and purchase information have been input into the terminal device, an authorization request message is sent from the terminal device to the issuer at step 204 to charge the purchase price to the customer's credit account. Having recognized the type of credit card and knowing that reward redemption may be possible with this type of card, the terminal device also includes a rewards redemption indicator in the authorization request.

Upon receiving the authorization request, the issuer decrements the customer's "open-to-buy" (i.e., the amount of credit available for purchases in the customer's credit account) with the total sale amount at step 206. Additionally, the issuer obtains the maximum available amount for use from the customer's rewards account for this transaction and holds this amount from the rewards account to ensure its availability at time of settlement. If sufficient credit is available, then, at step 208, the issuer returns an approval for the authorization request for both a credit charge of the purchase amount, and for a rewards charge of the available amount.

Upon receiving the approval, at step 210 the merchant, preferably via the terminal device, presents the customer with an option of redeeming rewards from his rewards account. The terminal device preferably has a display that prompts the customer with a message and invites the customer to select an amount of rewards, up to the available amount, to be used for the transaction. The customer selects his reward redemption option by, for example, entering an amount to redeem at step 212. At step 214, the terminal device determines whether the customer chose to apply the maximum available amount of rewards for redemption. If so, then the sale is approved and a receipt is generated at step 216. The sales receipt preferably indicates to the customer the breakdown of amounts to be charged to his credit account and his rewards account. If the customer selected less than the maximum available rewards for redemption, then an additional message is sent to the issuer, who releases the hold on the unused portion of the held rewards at step 218. In embodiments of the invention, the transaction is settled a later time, in accordance with procedures described below.

Figure 3:
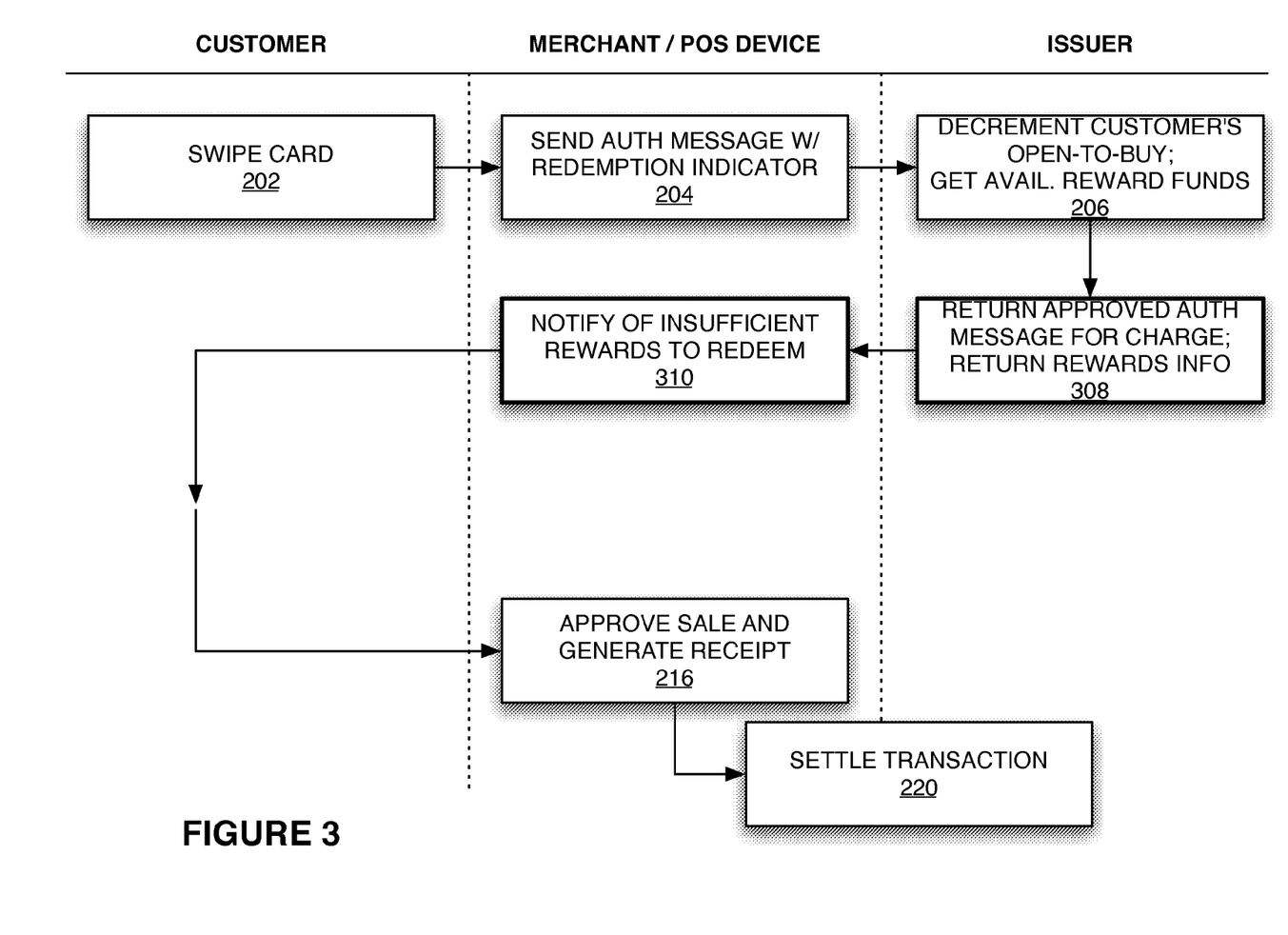
FIG. 3 is a flow diagram illustrating a method for redeeming rewards at a point-of-sale, in accordance with an embodiment of the invention.

In some instances, there will be insufficient rewards funds available for redemption in a customer's rewards account. For example, an issuer may require a minimum amount of rewards to be redeemed for any purchase. A method for handling such a situation is now described with respect to FIG. 3, in accordance with an embodiment of the invention. The transaction begins similarly to the general process described above with respect to FIG. 2 by swiping a card at step 202, sending an authorization request with reward redemption indicator at step 204, and decrementing the customer's open-to-buy with the total sale amount at step 206. At step 308, the issuer determines that there are not enough funds available in the rewards account to be redeemed with this transaction, and returns this information along with an approval to charge the customer's credit account. The terminal device or merchant notifies the customer that there are insufficient rewards available for redemption at step 310. The transaction then continues as a normal credit transaction by approving the sale and generating a receipt at step 216, and settling the transaction at step 220.

Figure 4:
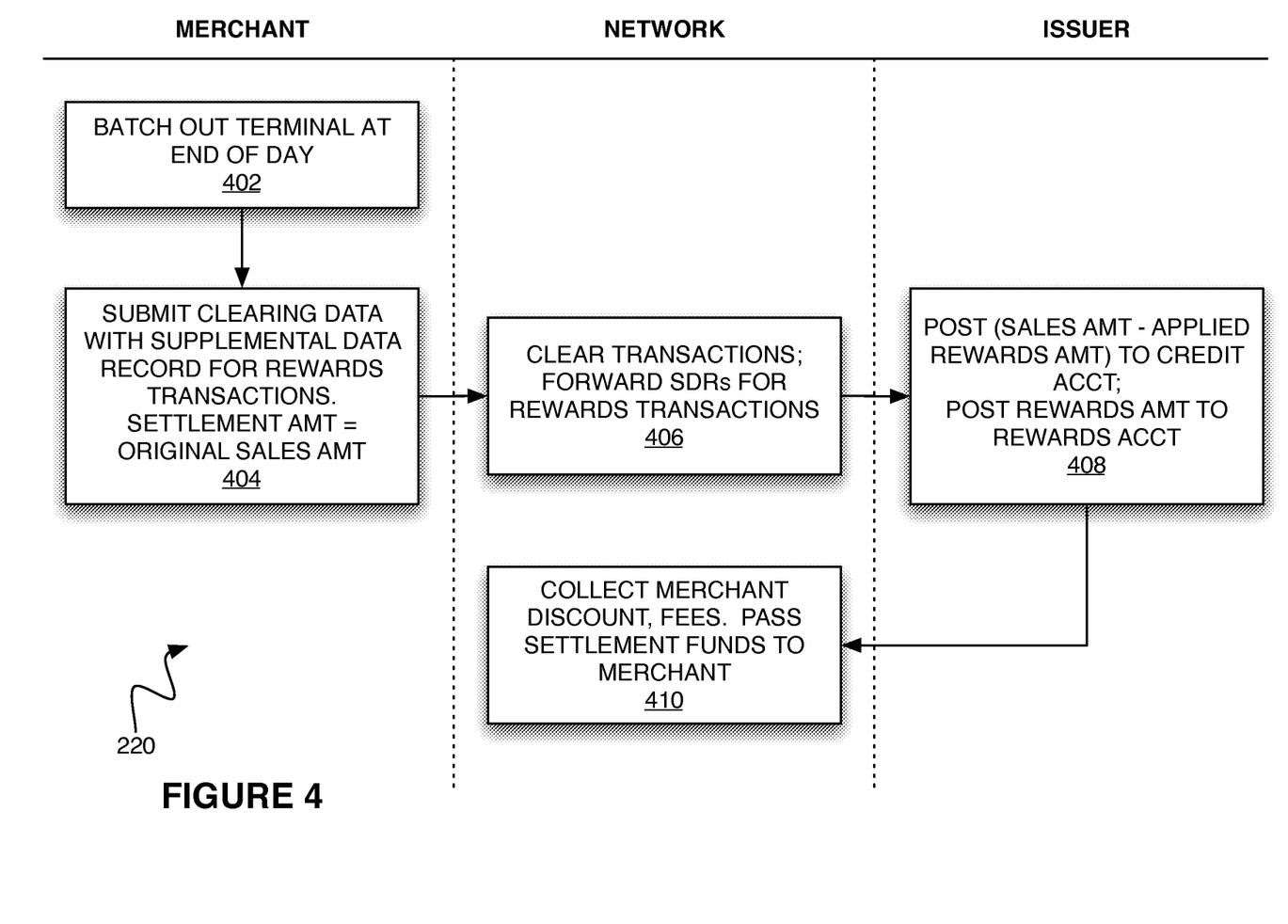
FIG. 4 is a flow diagram illustrating a method for settling transactions when rewards are redeemed at a point-of-sale, in accordance with an embodiment of the invention.

Turning attention to FIG. 4, a process for settling transactions is described. In embodiments of the invention, sales transactions by a merchant may be settled at the end of each day in order to transmit actual sales information from the merchant so that it can be compensated appropriately by the issuer for credited transactions, and so that customers' credit accounts and rewards accounts can be appropriately updated. At the end of a day, a merchant (or an acquiring bank on its behalf) batches out the terminal device or transaction database at step 402 and transmits the accumulated transaction records at step 404. For a transaction for which rewards were available to be redeemed, along with the corresponding transaction record is a supplemental data record containing reward redemption information that includes the rewards amount to be applied to the transaction. The settlement amount for such a transaction is the entire sales amount, even if some portion of that transaction was to be paid from redeemed rewards. At step 406, the network operator clears the credit transactions with the issuer and forwards the supplemental data records for rewards transactions.

After receiving the transaction data, the issuer at step 408 posts the sales amount, less the applied rewards amount, to the customer's credit account. The issuer also posts the redeemed rewards amount to the customer's rewards account. Any authorization holds that were placed on the accounts for that transaction are removed. The issuer then compensates the merchant, preferably through its acquiring bank, at step 410 by determining appropriate discounts and fees the issuer or network operator may have arranged with the merchant or its acquiring bank, and then transferring settlement funds to the merchant accordingly. Any amount of rewards that were used for the purchase are preferably not subtracted from the settlement amount, so that the merchant is compensated the same amount regardless of whether, or to what extent, rewards may have been used.

Figure 5:
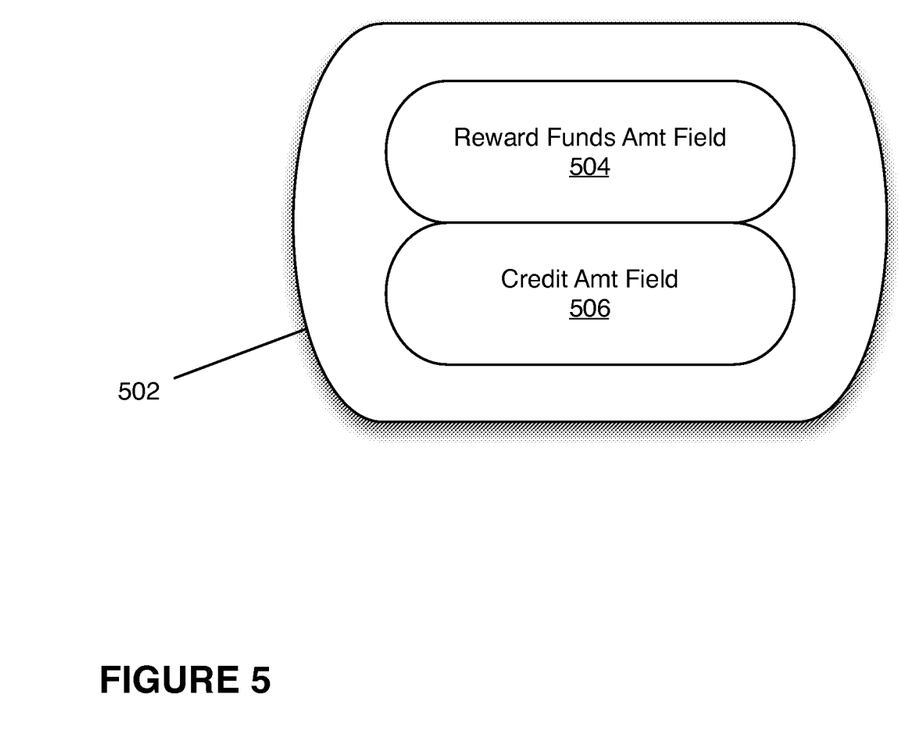
FIG. 5 is a diagram illustrating a data structure used for redeeming rewards at a point-of-sale, in accordance with an embodiment of the invention.

To facilitate efficient transmission and storage of reward redemption information, embodiments of the invention make use of a single data structure for holding both credit and rewards information, as shown in FIG. 5. The data structure 502 comprises two or more fields: a rewards funds amount field 504 and a credit amount field 506. The rewards funds amount field 504 preferably is used to represent the portion of a purchase to be paid from a customer's rewards account. The credit amount field 506 preferably is used to represent the portion of a purchase to be charged to a customer's credit account. By including both the rewards field 504 and the credit field 506 in a single data structure, these two fields can be sent in a single message from or to the merchant, and do not require the use of a separate transmission, or a secondary means of transmission.

Figure 6:
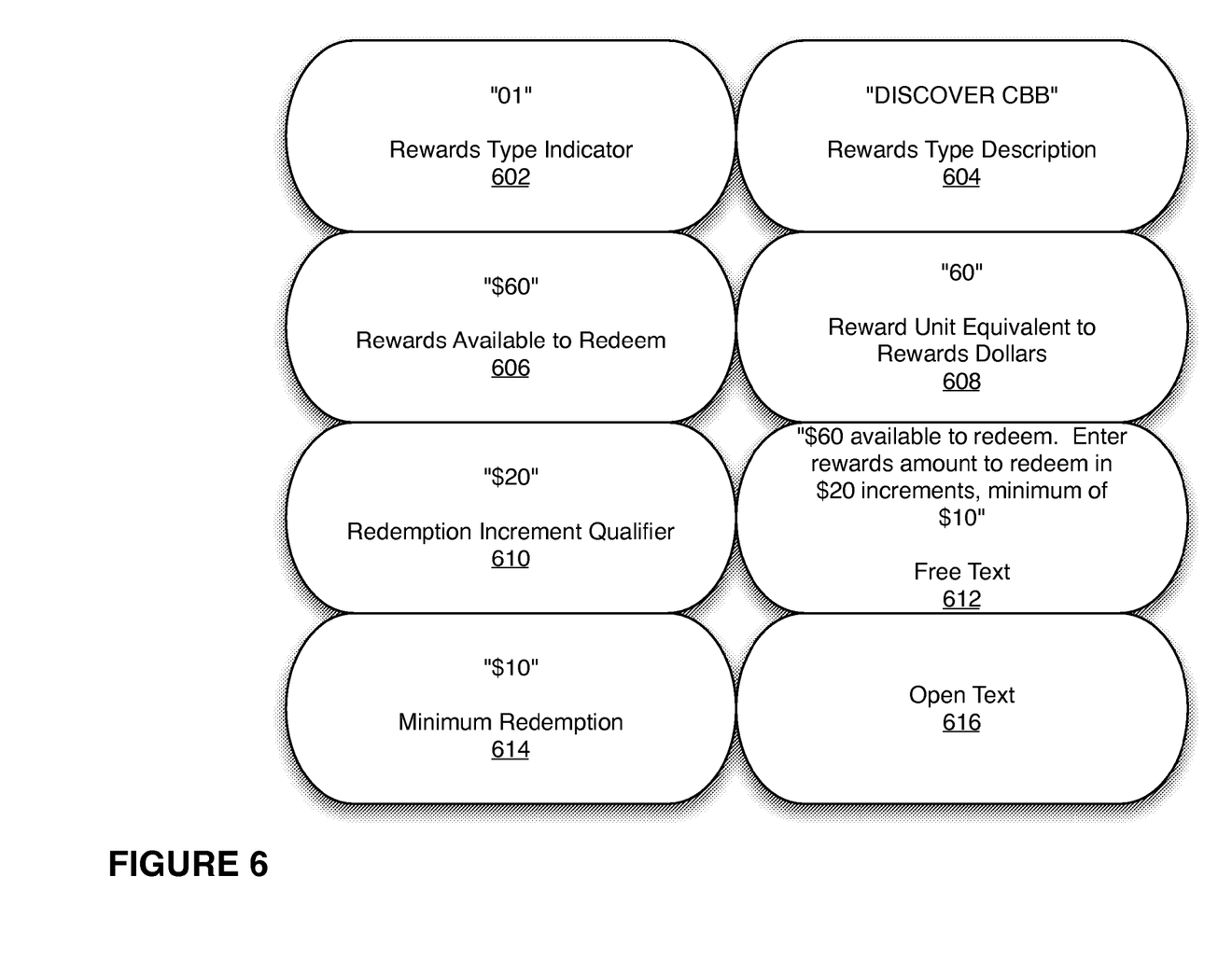
FIG. 6 is a diagram illustrating protocol parameters used for redeeming rewards at a point-of-sale, in accordance with an embodiment of the invention.

To further facilitate efficient transmission of reward redemption information, some embodiments of the invention use a communications protocol between issuer and merchant that allows for messages comprising several parameters, as shown in FIG. 6. A rewards type indicator 602 is used to indicate the type of rewards to be redeemed (e.g., "01" for DISCOVER CASHBACK BONUS, "02" for ACME AIRLINES points, etc.). A rewards type description parameter 604 is used to describe the type of rewards corresponding to the rewards type indicator (e.g., "DISCOVER CASHBACK BONUS"). A rewards dollars available to redeem parameter 606 is used to indicate the amount of rewards available to redeem from the customer's rewards account (e.g., $60). A reward unit equivalent to rewards dollars parameter 608 is used to indicate an equivalent number of rewards that can be redeemed (e.g., 600,000 miles). A redemption increment qualifier parameter 610 is used to indicate a fixed increment in which rewards may be redeemed (e.g., $20 increments). A free text parameter 612 is used to transmit messages from the issuer for display to the customer. The content of the free text parameter 612 can be displayed on a screen or printed for the customer or merchant. A minimum redemption parameter 614 is used to indicate a minimum amount that must be redeemed, if the customer is to redeem rewards. One or more open text parameters 616 are available for other purposes.

Figure 7:
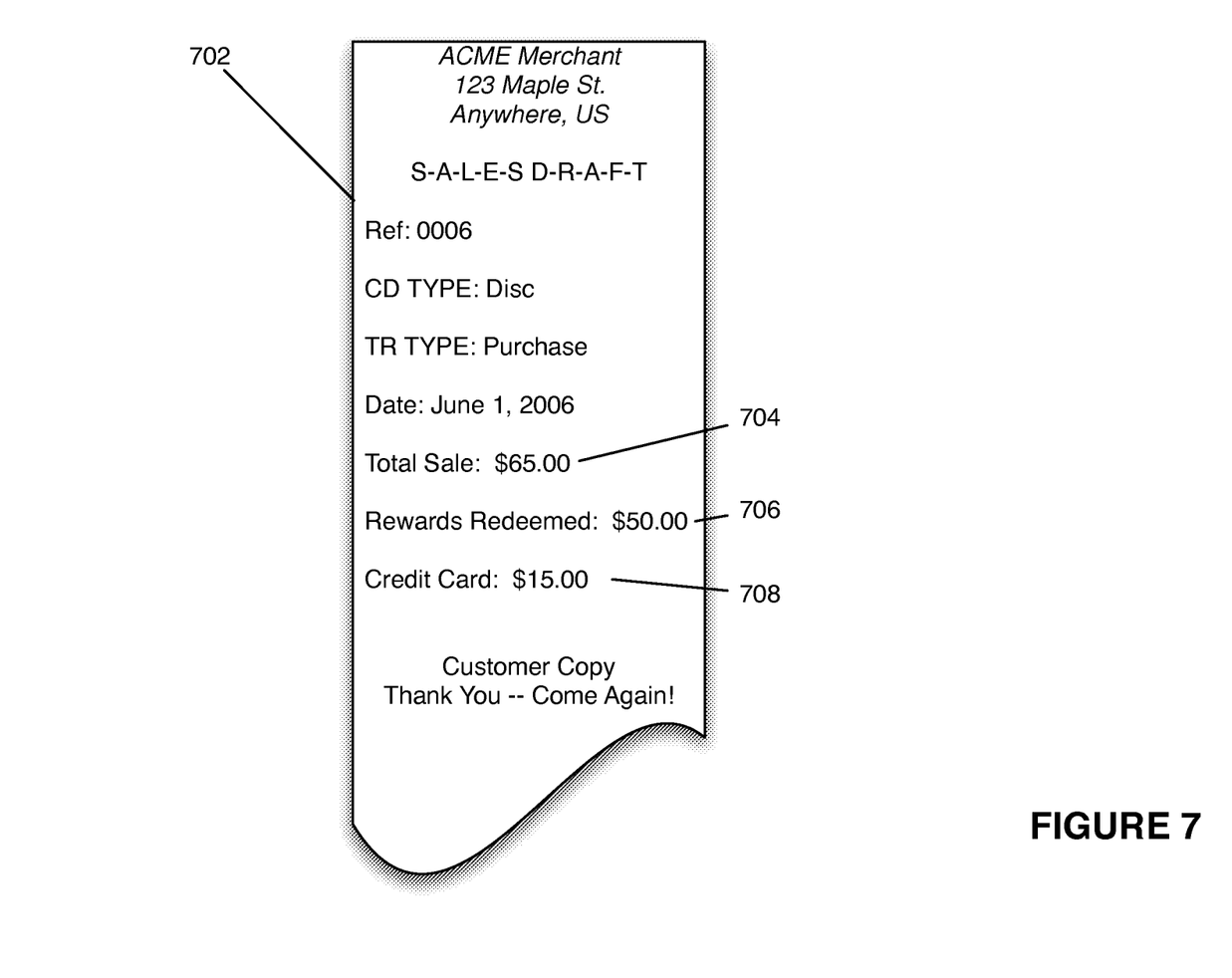
FIG. 7 is a diagram of a receipt generated when rewards are redeemed at a point-of-sale, in accordance with an embodiment of the invention.

A sample receipt 702 produced by a merchant resulting from a point-of-sale reward redemption is shown in FIG. 7, as used in an embodiment of the invention. In addition to standard sales receipt information, such as date and merchant information, the sample receipt 702 includes a breakdown of the total sale price 704 into components of rewards redeemed 706 and an amount charged to the customer's credit card 708.

Embodiments of the inventions are consistent with existing point-of-sale terminal devices and systems presently in use by merchants, issuers and network operators, which can be modified if necessary through software or hardware updates. For example, the merchant's terminal equipment can be modified to: send an indicator that the terminal is capable of transacting rewards, and that a customer's rewards account may be accessible for redemption for a swiped card; receive rewards data from the issuer; prompt for rewards redemption options and/or balance inquiries; display customized messages from the issuer; and send an authorization message when a customer redeems less than the maximum available rewards. The merchant's batch transaction system can be modified to include a supplemental data record that is passed to include reward transaction data. The merchant's register can be modified to include redeemed rewards and/or additional bonus rewards, as well as other customized messages, on printed receipts. Similarly, the network operator's authorization and settlement file specifications can be modified to support rewards transactions and the fields of a supplemental data record. The issuer's systems can be modified to receive rewards indicators, pass and receive rewards data and customized messages, and respond to authorization advice messages and rewards balance inquiries.

Embodiments of the invention further include opportunities for providing customer incentives by increasing the purchasing power of rewards when used at particular merchants. For example, a merchant may have entered an arrangement with the issuer whereby rewards from the issuers' rewards accounts are worth an extra amount, or "bonus" (e.g., double, 150%, etc.), when redeemed for purchases at that merchant. Under such an arrangement, a customer may be more inclined to make his purchase at one merchant than at another merchant that does not have such an arrangement. Embodiments of the invention can provide point-of-sale reward redemption with bonuses in any of a number of ways. Preferably, the customer is notified, on the display of a terminal device after swiping his card, that his rewards are entitled to a bonus at this merchant (e.g., "Receive an additional $10 for every $20 rewards redeemed"). The bonus amount need not be posted to the customer's rewards account, so that the amount of rewards posted to the rewards are account is less than the actual amount of rewards applied to the transaction. If the cost of the bonus is to be borne fully or partially by the merchant, an appropriate amount can be deducted during settlement. Alternatively, the merchant can be fully compensated for the transaction, with adjustments for bonuses made in another financial transaction between issuer and merchant.

Figure 8:
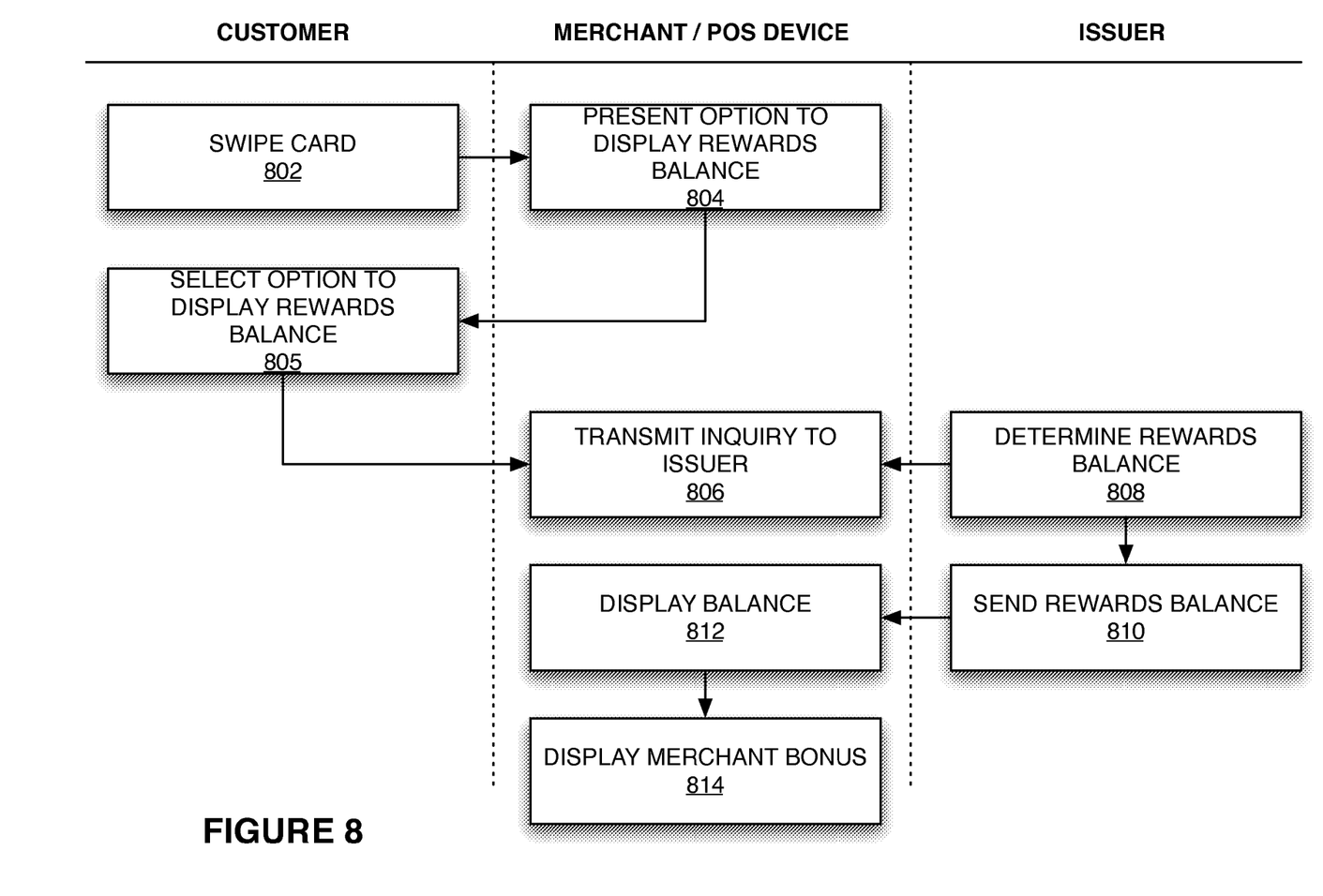
FIG. 8 is a flow diagram illustrating a method for redeeming rewards at a point-of-sale, in accordance with an embodiment of the invention.

In addition to or in combination with any of the previously described processes, embodiments of the invention allow a customer to check the amount of rewards in his rewards account that are available for redemption via a balance inquiry feature, as now described with respect to FIG. 8. The balance inquiry function can preferably be incorporated into purchase transactions as described above, or can be accessed independently from any purchase transactions, such as at a standalone balance inquiry terminal. The customer (or merchant representative) swipes the card in a terminal device at step 802. An option to check rewards balance is displayed on the terminal device at step 804, and is selected by the customer at step 805. If the terminal is a balance inquiry-only terminal, no other options need be displayed. At step 806, an inquiry is sent to the issuer via the network operator. The issuer receives the inquiry and determines the rewards account balance at step 808. The issuer sends this amount back to the merchant via the network at step 810, and the balance is displayed on the terminal device at step 812. In some embodiments, any available merchant bonus is additionally displayed on the terminal device at step 814.

Embodiments of the invention further allow the redemption of rewards at a point-of-sale in combination with forms of currency other than credit cards. This can be useful, for example, if there is insufficient credit available in the customer's credit account. In such a situation, the customer is preferably notified via a display on the terminal device that there is insufficient credit available in the credit account to pay for the non-rewards portion of the transaction, and that another form of payment must be presented. The customer can then pay for the balance of the transaction with another form accepted by the merchant (e.g., cash, check, debit card, etc.) Options for acceptable forms of payment can be presented on the terminal device display.

Embodiments of the invention are not limited to transactions with physical cards in physical space. In one embodiment of the invention, sales are conducted via network computers connected via, for example, the Internet. In this embodiment, the customer may be located in front of a personal computer, which serves as the point-of-sale terminal device for an online transaction. At time of payment, the customer enters his credit card information onto his computer, and the information is sent electronically to the merchant or a transaction processing entity for the merchant which obtains the rewards information as previously described. The merchant can perform any necessary authorization through the credit card network. Alternatively, on online merchant can provide a web service, such as a Java applet or XML-based application, to the customer to allow authorization directly from the customer's computer. Options for redeeming rewards from the customer's account are then presented on the customer's computer.

In additional embodiments, customers may receive promotions or messages after swiping their cards. For example, an issuer may randomly give free transactions (e.g., 1 in 10,000). The customized display is used to inform the customer of his prize. Similarly, customers may be presented with discounts via the terminal device based on any combination of the merchant and/or merchandise being purchased. For example, a customer using his card at an electronics store to buy a certain model of television might receive a discount that is applied directly to the purchase by the issuer based on, e.g., transmitted SKU information for the television.

Figure 9:
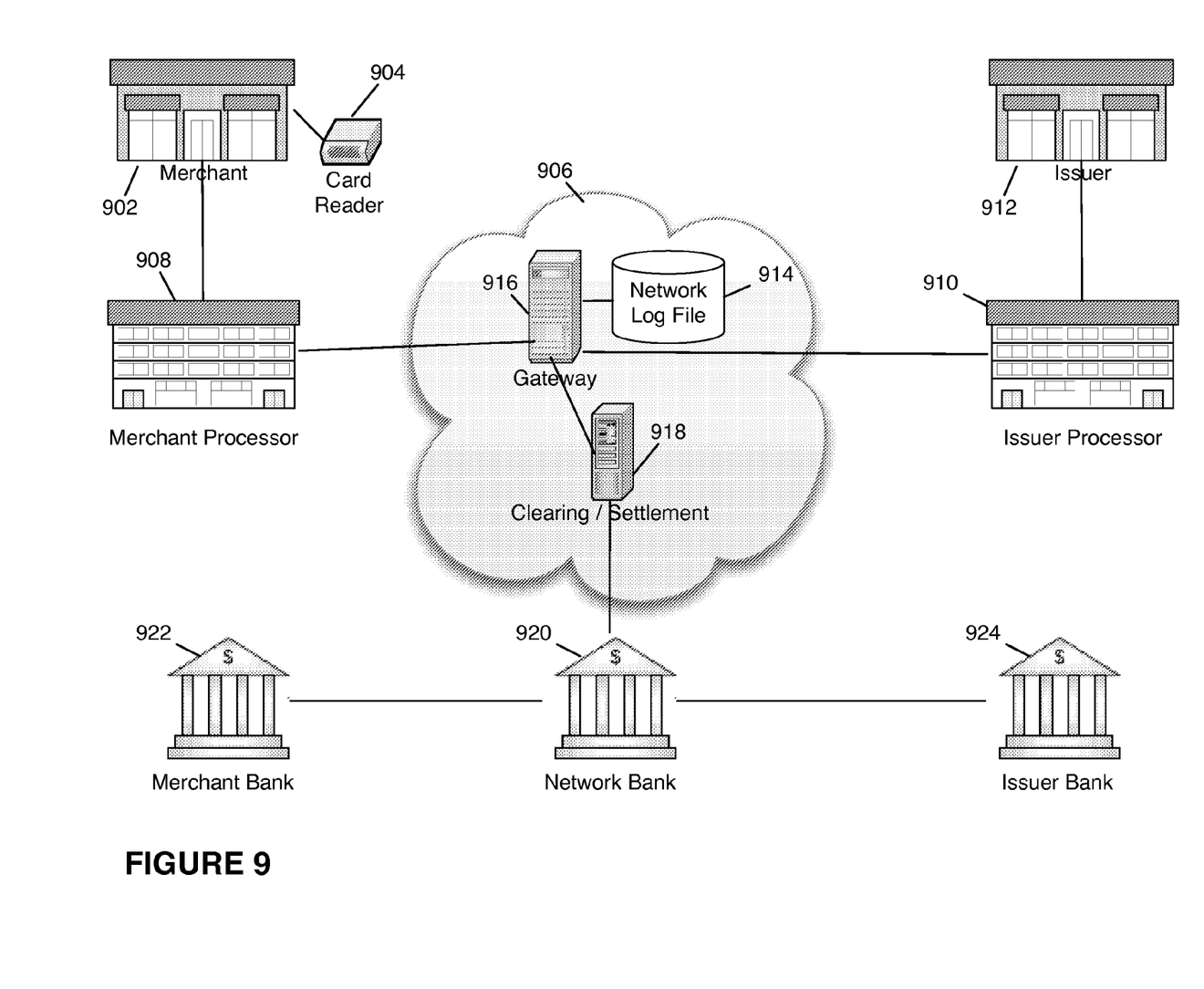
FIG. 9 is a general overview of an environment for authorizing and processing non-financial fee transactions, in accordance with an embodiment of the invention.

Turning to FIG. 9, a system for authorizing and processing non-financial fee transactions is shown with reference to an overall credit card usage environment. In some embodiments of the invention, an infrastructure used to support point-of-sale reward redemption, as described above, can also be used to support non-financial transactions. Examples of such non-financial transactions include, but are not limited to: merchant loyalty program transactions; applications for new credit or other program; and looking up account information. These types of non-financial transactions have a wide variety of uses. By way of example only, some uses contemplated by the invention include: a doctor's office can verify the status of a patient's health care coverage; a merchant can verify a cardholder's participation in a discount program; or a customer can be pre-screened for credit approval and apply for a private label (merchant) credit card. Such transactions may not have any financial components themselves, but may be relevant to financial transactions. These non-financial transactions generally include a card issued to a cardholder for financial transactions (e.g., a credit card or debit card), or specifically for the non-financial transaction type.

In an embodiment of the invention, the general environment for the non-financial transaction authorization and processing is similar to the environment shown in FIG. 1. Different aspects of that environment may be shown in FIG. 9 for clarity of discussion within the general non-financial transaction context. For an authorization, a merchant 902 has a card reader 904 (or other point-of-sale device as discussed above) for reading a card of a cardholder. The card reader 904 is programmed to recognize one or more non-financial transaction types, and communicates either directly or indirectly to a payments network 906, such as the DISCOVER brand network. When the cardholder participates in a non-financial transaction using the card, no monetary record is required to be sent to the payments network 906 because there is no monetary information in the non-financial transaction. The card reader 904, using a function to indicate the specific non-financial transaction type, preferably notifies a merchant processor 908, which sends an authorization request (e.g., an ISO x100 message) to the payments network 906 for authorization of the transaction. The merchant processor 908 recognizes that the transaction is not financial, and does not need to create a monetary record. The authorization request preferably includes a primary account number (card number), a processing code (a unique ID that indicates the non-financial transaction type), and a transaction amount of $0.

The payments network 906, upon receiving the authorization request, passes it to the issuer processor 910, who recognizes the type of non-financial transaction from the processing code and, if the transaction is authorized, returns a message (e.g., an ISO x110 message) with an approval code and other required information for the transaction type. For example, if a cardholder has swiped his card at his doctor's office, the issuer processor 910 can return a notification that there will be a co-pay of $10. Communication between the issuer processor 910 and the issuer 912 can be performed in processing the request, if necessary. The message is returned through the payments network 906 and merchant processor 908 to the card reader 904, which approves the transaction and prints any additional information for the transaction type.

In embodiments of the invention, the payments network 906 maintains a record of non-financial transactions in a log file 914 stored at the network gateway 916. The gateway 916 preferably creates monetary records from the log file 914 which periodically (e.g., at the end of each day) are sent to a clearing and settlement system 918. The clearing and settlement system 918 assesses the appropriate fees to charge the merchant 908 and issuer 910 for the non-financial transactions, which are included in account activity files that are sent to the merchant 908 and issuer 910. The payments network 906 preferably collects the fees for the non-financial transactions as part of a regular settlement process (e.g., at day's end, monthly, etc.), as the network 906 would do with financial transactions via its bank 920, the merchant bank 922 and the issuer bank As can be seen, a point-of-sale reward redemption system for financial alternatives to currency is presented. In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

What is claimed is:

1. A method for enabling a customer to pay for goods or services at a merchant's physical point of sale using a combination of monetary funds and/or reward funds associated with a customer's payment device, the method comprising:

receiving a request from a terminal device located at the merchant's physical point of sale to authorize a transaction to be funded with a combination of zero or more monetary funds and one or more reward funds, the monetary funds and reward funds each being associated with a single customer, the monetary funds being further associated with a credit or debit account, and the reward funds being further associated with a reward funds account, the request comprising an indicator that the terminal device is capable of processing a message comprising a monetary funds field and a reward funds field for transacting the reward funds at the merchant's physical point of sale, wherein the request is generated by the terminal device in response to interfacing with the customer's payment device;

determining, in response to the request, a maximum amount of reward funds that can be used for the transaction;

decrementing, in response to the request, a total available monetary funds associated with the credit or debit account by a transaction value amount;

sending to the terminal device a single response approving for the transaction monetary funds in the amount decremented from the total available monetary funds and a reward funds charge in the maximum amount of reward funds that can be used for the transaction; and subsequent to the sending step, receiving a notification from the terminal device located at the merchant's physical point of sale, the notification reflecting an allocation by the customer via the terminal device of an amount to be charged from the debit or credit account and an amount to be deducted from the reward funds account, the allocation based on the monetary and reward funds in the response.

2. The method of claim 1 wherein the terminal device is a cash register.

3. The method of claim 1 wherein the terminal device is a computing device.

4. The method of claim 1 further comprising:
causing the merchant to be compensated for the transaction independent of the allocation made by the customer.

5. The method of claim 1 wherein the notification occurs via a transaction processing network.

6. The method of claim 1 further comprising:
holding from the customer's reward funds account the maximum amount of reward funds that can be used for the transaction;
determining that the amount to be deducted from the reward funds account is less than the maximum amount of reward funds that can be used for the transaction; and
releasing an amount of reward funds equal to a difference between the maximum amount of reward funds that can be used for the transaction and the amount to be deducted from the reward funds account.

7. The method of claim 1 wherein the amount to be deducted from the reward funds account is less than the maximum amount of reward funds that can be used for the transaction.

8. The method of claim 1 wherein the customer effectuates the transaction using a card and only one set of indicia contained on the card.

9. The method of claim 1 wherein the customer's payment device is selected from the group consisting of: a credit card, a mobile telephone, a personal digital assistant, a smart card, a U.S.B. drive, and a biometric payment device.

* * * * *